US011273574B2

(12) United States Patent
Kreiger et al.

(10) Patent No.: US 11,273,574 B2
(45) Date of Patent: Mar. 15, 2022

(54) SCALABLE THREE DIMENSIONAL PRINTING APPARATUS

(71) Applicants:Megan A Kreiger, Champaign, IL (US); Michael Patrick Case, Mahomet, IL (US); Gerald R. Northrup, Champaign, IL (US); Ghassan Al-Chaar, Champaign, IL (US); Bruce A MacAllister, Mahomet, IL (US); William Jacob Wagner, Champaign, IL (US)

(72) Inventors: Megan A Kreiger, Champaign, IL (US); Michael Patrick Case, Mahomet, IL (US); Gerald R. Northrup, Champaign, IL (US); Ghassan Al-Chaar, Champaign, IL (US); Bruce A MacAllister, Mahomet, IL (US); William Jacob Wagner, Champaign, IL (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 695 days.

(21) Appl. No.: 15/249,739

(22) Filed: Aug. 29, 2016

(65) Prior Publication Data

US 2018/0056544 A1 Mar. 1, 2018

(51) Int. Cl.
*B28B 1/00* (2006.01)
*E04G 21/04* (2006.01)
(Continued)

(52) U.S. Cl.
CPC ............... *B28B 1/001* (2013.01); *B28B 3/20* (2013.01); *B29C 64/106* (2017.08);
(Continued)

(58) Field of Classification Search
CPC .. B28B 1/001; B28B 3/20; B28B 1/00; B28B 1/093; B29C 64/106; B29C 64/236;
(Continued)

(56) References Cited

U.S. PATENT DOCUMENTS 5,085,824 A * 2/1992 Busch ....................... B66C 9/16
376/268
7,153,454 B2 12/2006 Khoshnevis
(Continued)

FOREIGN PATENT DOCUMENTS

EP 0094703 A2 * 11/1983 ............... B66C 9/16

OTHER PUBLICATIONS

EP0094703_Machine Translation (Year: 1983).*

*Primary Examiner* — Matthew J Daniels
*Assistant Examiner* — Yunju Kim
(74) *Attorney, Agent, or Firm* — Brian C. Jones

(57) ABSTRACT

A scalable three dimensional printing apparatus capable of movement along three axes includes a tractor assembly movable along a selectively extendable rail component. Wheels in the tractor assembly surround part of the rail component to enable movement of a gantry bridge in a longitudinal direction along the rails. A movable printing trolley moves horizontally along a gantry bridge and has a printing column which can move vertically. Because the gantry bridge, trolley, and printing column move orthogonally to each other, users may print in three dimensions. Selective extension of the rails allows a user to alter lengthwise printing scale.

20 Claims, 4 Drawing Sheets

(51) Int. Cl.
  *B29C 64/106* (2017.01)
  *B28B 3/20* (2006.01)
  *B29C 64/236* (2017.01)
  *B33Y 30/00* (2015.01)
  *B33Y 40/00* (2020.01)

(52) U.S. Cl.
  CPC ............ *B29C 64/236* (2017.08); *B33Y 30/00* (2014.12); *B33Y 40/00* (2014.12); *E04G 21/04* (2013.01)

(58) Field of Classification Search
  CPC ......... B33Y 30/00; B33Y 40/00; B33Y 70/00; E04G 21/04; A01G 25/09; G06F 19/00; A61B 6/12; B66C 9/16
  USPC .............. 425/135; 137/899; 700/245; 378/20
  See application file for complete search history.

(56) References Cited

U.S. PATENT DOCUMENTS

| | | | |
|---|---|---|---|
| 7,452,196 | B2 | 11/2008 | Khoshnevis |
| 7,641,461 | B2 | 1/2010 | Khoshnevis |
| 7,814,937 | B2 | 10/2010 | Khoshnevis |
| 8,029,258 | B2 | 10/2011 | Khoshnevis |
| 8,029,710 | B2 | 10/2011 | Khoshnevis |
| 8,518,308 | B2 | 8/2013 | Khoshnevis |
| 8,801,415 | B2 | 8/2014 | Khoshnevis |
| 9,206,601 | B2 | 12/2015 | Khoshnevis |
| 2003/0229421 | A1* | 12/2003 | Chmura .................... A47L 5/36 700/245 |
| 2004/0164436 | A1 | 8/2004 | Khoshnevis |
| 2005/0196484 | A1 | 9/2005 | Khoshnevis |
| 2005/0280185 | A1 | 12/2005 | Russell et al. |
| 2007/0181519 | A1 | 8/2007 | Khoshnevis |
| 2008/0013678 | A1* | 1/2008 | Magerl .................. A61B 90/50 378/20 |
| 2009/0043424 | A1 | 2/2009 | Khoshnevis |
| 2010/0025349 | A1 | 2/2010 | Khoshnevis |
| 2010/0257792 | A1 | 10/2010 | Khoshnevis |
| 2010/0318222 | A1 | 12/2010 | Khoshnevis |
| 2011/0076350 | A1 | 3/2011 | Khoshnevis |
| 2012/0038074 | A1 | 2/2012 | Khoshnevis |
| 2014/0308381 | A1 | 11/2014 | Khoshnevis |
| 2015/0239148 | A1* | 8/2015 | Israel .................... B33Y 10/00 264/40.3 |
| 2015/0300036 | A1 | 11/2015 | Khoshnevis |
| 2016/0083956 | A1 | 3/2016 | Khoshnevis |

* cited by examiner

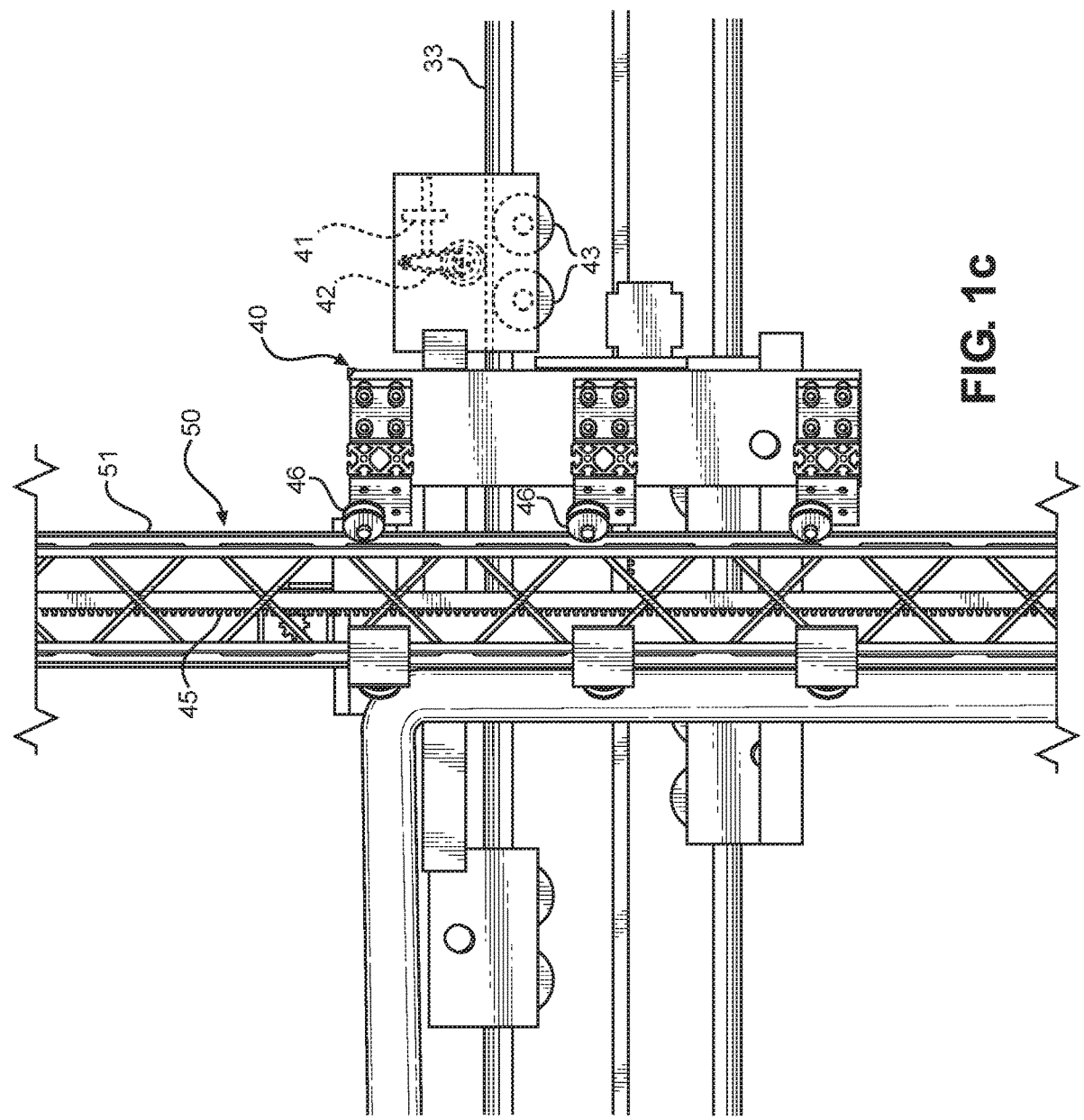

SCALABLE THREE DIMENSIONAL PRINTING APPARATUS

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

CROSS-REFERENCE TO RELATED APPLICATIONS

This patent application claims the benefit of U.S. Provisional Application No. 62/365,338 filed Jul. 21, 2016. The above application is incorporated by reference herein in its entirety.

FIELD OF INVENTION

This invention relates to the field of three-dimensional printing apparatuses for building construction and more specifically to an apparatus for fabricating structures from concrete and other high-strength aggregate materials.

BACKGROUND OF THE INVENTION

Three-dimensional printing methods are known in the art and have been successfully used to rapidly construct buildings. For example, Behrokh Khoshnevis of the University of Southern California Information Sciences Institute (in the Viterbi School of Engineering) has developed a printing method that uses a computer-controlled crane or gantry to rapidly construct buildings by deposition of printed cement layers. NASA has evaluated this technology for the construction of structures that can be constructed primarily from lunar material.

U.S. Pat Nos. 7,641,461, 7,814,937, and 8,029,710 teach the use of extrusion nozzles in a computer-controlled gantry system which moves the nozzle back and forth to fabricate buildings layer by layer. A gantry is a raised, bridge-like structure which supports equipment such as the printing head. The above systems also incorporate complex robotic arms and vehicles for movement and support. This fabrication processes using such systems reduce labor and increase the speed at which buildings can be constructed. However, the technology disclosed in these patents is not suitable for structures of variable scale required for military operations, which can range from guard posts to airplane hangars. Currently, specialized systems must be custom manufactured for building projects of varying scales and structures of various sizes.

Additionally, current systems known in the art require movement of a heavy vertical assembly by multiple drives, a process which becomes more difficult as the size of the print area increases. As a result, errors in printing head positioning due to drives slipping or otherwise inaccurate positioning can create flaws in the building, in some cases rendering them unsafe or otherwise unusable. Such systems also use positioning drivers which may not be sufficiently durable to accommodate large-scale building projects or inhospitable field conditions.

There is an unmet need in the art for a three-dimensional printing system which is adaptable to numerous building scales and offers highly accurate positioning of a printing head.

There is a further unmet need in the art for a three-dimensional printing system with a durable drive system.

BRIEF SUMMARY OF THE INVENTION

A scalable three dimensional printing apparatus capable of movement along three axes includes a tractor assembly movable along a selectively extendable rail component. Wheels in the tractor assembly surround part of the rail component to enable movement of a gantry bridge in a longitudinal direction along the rails. A movable printing trolley moves horizontally along a gantry bridge and has a printing column which can move vertically. Because the gantry bridge, trolley, and printing column move orthogonally to each other, users may print in three dimensions. Selective extension of the rails allows a user to alter lengthwise printing scale. In certain embodiments, selective replacement of the gantry bridge and printing column also allows a user to alter horizontal and vertical printing scale, respectively.

BRIEF DESCRIPTION OF SEVERAL VIEWS OF THE DRAWING(S)

FIGS. 1c and 1d illustrate side and top views of exemplary embodiments of a printing trolley and a printing column.

TERMS OF ART

As used herein, the term "drive wheel" refers to a wheel which is actively rotated by a drive or motor.

As used herein, the term "fixed wheel" refers to a wheel which is passively rotated by friction.

As used herein, the term "telescoping" refers to a characteristic of a structural element that allows the structural element to selectively expand and contract along an axis.

DETAILED DESCRIPTION OF THE INVENTION

Figure 1A:
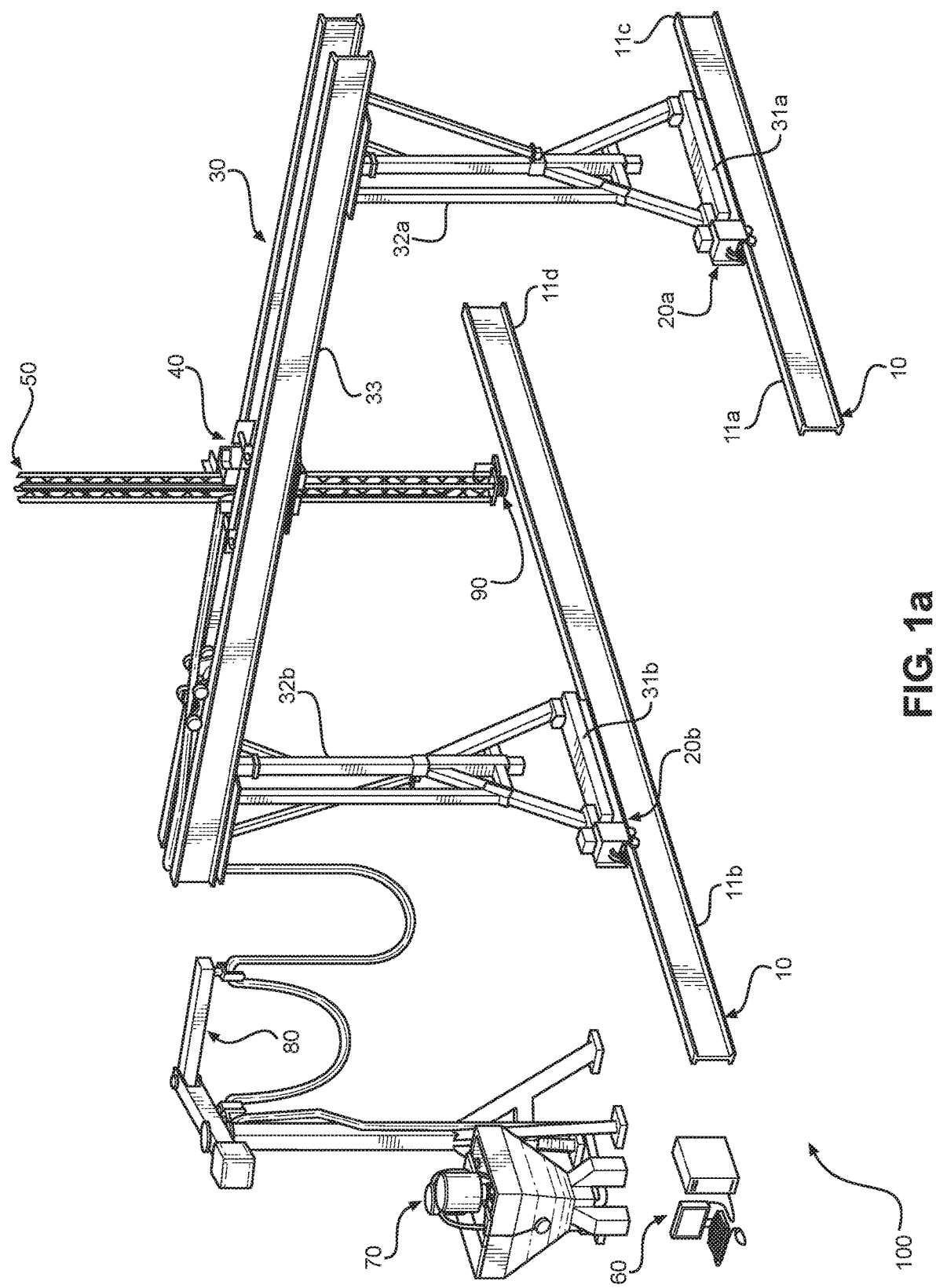
FIG. 1a illustrates a perspective view of an exemplary embodiment of a scalable three dimensional printing apparatus.
Figure 1B:
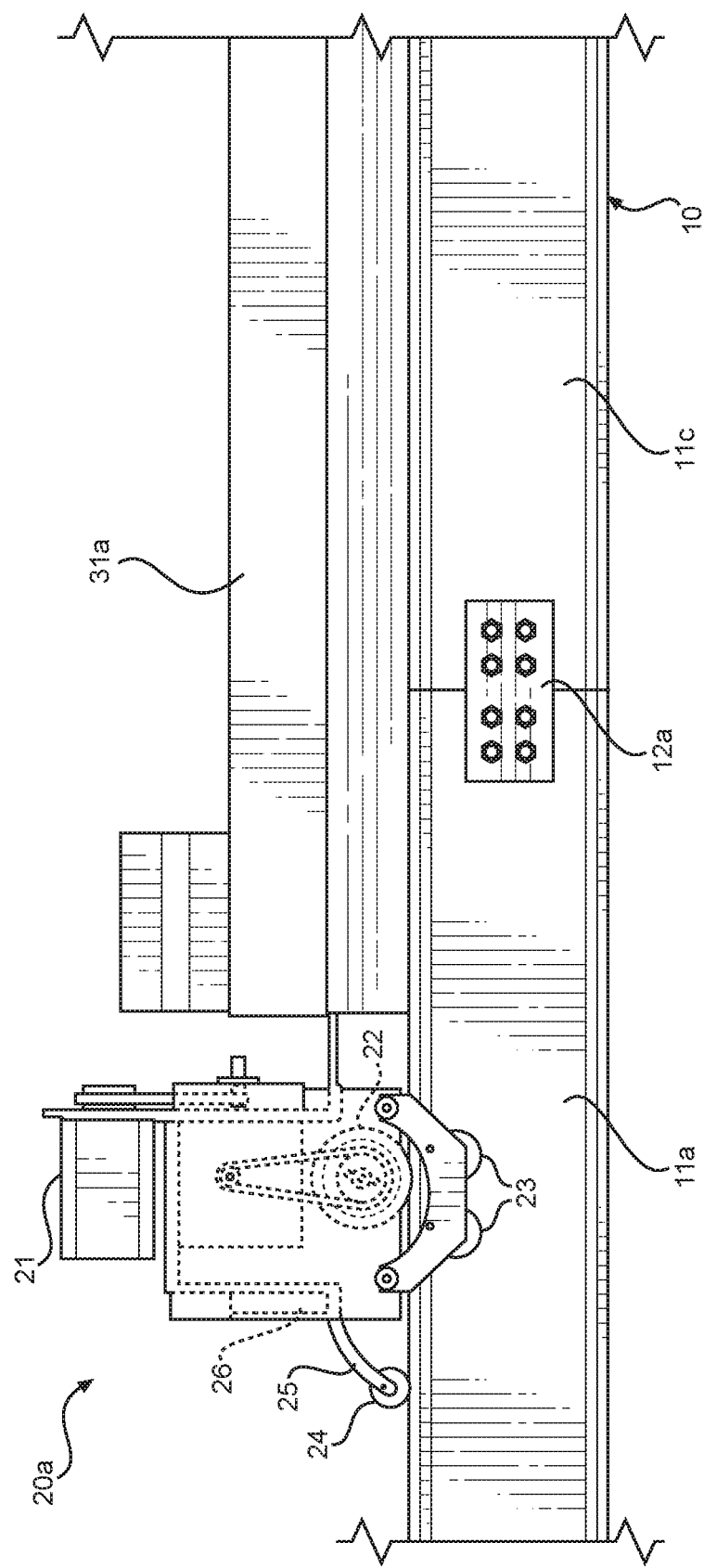
FIG. 1b illustrates a side view of an exemplary embodiment of a first tractor assembly.
Figure 1D:
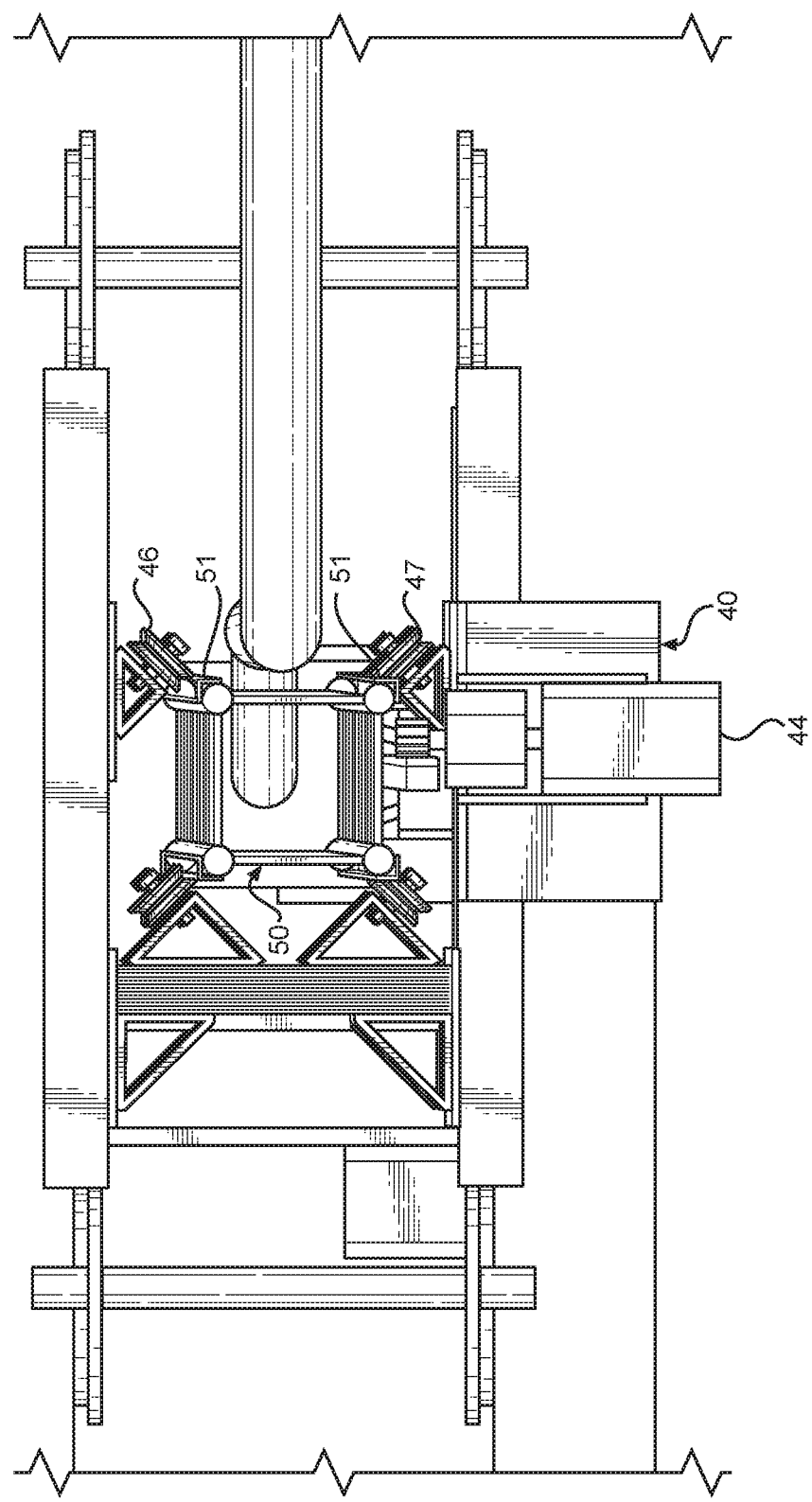

FIG. 1a illustrates a perspective view of an exemplary embodiment of scalable three dimensional printing apparatus 100. FIG. 1b illustrates a side view of an exemplary embodiment of first tractor assembly 20a. FIGS. 1c and 1d illustrate side and top views of exemplary embodiments of printing trolley 40 and printing column 50.

Apparatus 100 includes a selectively extendable runway assembly 10, upon which rest first tractor assembly 20a and a second tractor assembly 20b. First and second tractor assembly 20a and 20b move a gantry assembly 30 in a longitudinal direction. Printing trolley 40, which in turn rests on gantry assembly 30, moves in a transverse direction along gantry assembly 30. Printing trolley 40 also raises and lowers printing column 50 in a vertical direction. As a result, a user may print in three dimensions using apparatus 100. Movement of the elements of apparatus 100 is controlled by a machine controller 60, which is known in the prior art. A concrete pump 70 attached to a hose management apparatus 80 supplies concrete, which is expelled through printing head 90.

Runway assembly 10 is made up of at least a first and a second runway rail 11a and 11b located beneath opposite sides of gantry assembly 30. In the exemplary embodiment, runway rails 11a and 11b are girder with an I-shaped cross section. Other embodiments may use rails with a different cross-section. Runway rails 11a and 11b are selectively expandable. In the exemplary embodiment, additional runway rails 11c and 11d may be attached end-to-end to runway rails 11a and 11b, respectively, to extend the overall length of runway assembly 10 and provide a greater range of lengths in printed structures. Runway rails 11a and 11c shown in FIG. 1b may be attached by means of rail connector 12a. In the exemplary embodiment, rail connector 12a is a plate attached to the central web of the I-shaped cross section of runway rails 11a and 11b. In other embodiments, rail connectors are sleeves sliding over the ends of runway rails 11a and 11b. Certain embodiments may extend the overall length of runway assembly 10 even further by attaching still more rail connectors.

Tractor assembly 20a is attached to gantry assembly 30 and is movably attached to runway rail 11a. In the exemplary embodiment, tractor assembly 20a is a tractor assembly. Tractor motor 21 drives at least one tractor drive wheel 22, which is in contact with a first surface of runway rail 11a. Tractor fixed wheels 23 contact a second surface of runway rail 11a opposite the first surface, effectively "gripping" runway rail 11a between tractor drive wheel 22 and tractor fixed wheels 23. Due to the friction between tractor drive wheel 22 and runway rail 11a, movement of tractor drive wheel 22 causes tractor assembly 20a and gantry assembly 30 to travel along runway assembly 10. In the exemplary embodiment, tractor motor 21 is connected to tractor drive wheel 22 by a continuous loop, such as a cable, belt, or chain. In other embodiments, tractor motor 21 is also connected to tractor drive wheel 22 by a gearbox, or is connected directly to tractor drive wheel 22.

Because tractor drive wheel 22 may slip from contact with runway rail 11a, tractor assembly 20a includes a feedback wheel 24 in contact with some portion of runway rail 11a. A rotational sensor 25 connected to feedback wheel 24 provides machine controller 60 with positional feedback by reporting the angular position of feedback wheel 24. In the exemplary embodiment, rotational sensor 25 is a rotary measurement device such as, but not limited to, an encoder, a resolver, a synchro, a rotary variable differential transformer, or a rotary potentiometer. Embodiments which use an encoder may use encoders such as, but not limited to, optical, mechanical, magnetic, or capacitive encoders. Any of the preceding encoders may be absolute or incremental. Optionally, feedback wheel 24 may be biased into place against runway rail 11a by means of a biasing mechanism 26, such as, but not limited to, a spring tensioner, an additional wheel contacting a surface of runway rail 11a opposite feedback wheel 24, a clamp, or any combination thereof.

Tractor assembly 20b is attached to gantry assembly 30 and is movably attached to runway rail 11b. In the exemplary embodiment, tractor assembly 20b is identical to tractor assembly 20a in both structure and function. Other embodiments may lack more than one tractor assembly. Such an embodiment would be used in a smaller apparatus 100 where there was no risk of gantry assembly 30 flexing and racking due to inertia and stiffness of gantry assembly 30.

Gantry assembly 30 is "pulled" or "pushed" along runway assembly 10 by tractor assemblies 20a and 20b, which are connected to gantry trucks 31a and 31b, respectively. Gantry legs 32a and 32b are attached to gantry trucks 31a and 31b, respectively, and support gantry bridge 33. In certain embodiments, gantry legs 32a and 32b are telescoping to allow a greater range of height in printed structures. Gantry bridge 33 extends between gantry legs 32a and 32b. Gantry bridge 33 is selectively replaceable, i.e. modular and may be removed and replaced as needed in order to provide a greater range of width in printed structures.

In the exemplary embodiment, printing trolley 40 moves horizontally along gantry bridge 33, employing a similar drive apparatus to tractor assembly 20a. Trolley motor 41 drives trolley drive wheel 42, which is in contact with a first surface of gantry bridge 33. Trolley fixed wheel 43 contacts a second surface of gantry bridge 33 opposite the first surface, effectively "gripping" gantry bridge 33 between trolley drive wheel 42 and trolley fixed wheel 43. In alternate embodiments, printing trolley uses a rack-and-pinion, cable, or chain drive system. Printing trolley 40 also includes a column driver 44 connected to a rack and pinion drive system 45 for raising and lowering printing column 50. Multiple column rollers 46 each have a surface groove 47 for interacting with and guiding the movement of printing column 50. Column rollers 46 are located in multiple planes relative to printing column 50 to provide additional positioning support and stability. In certain embodiments, column driver 44 is connected to a threaded rod, hydraulic cylinder, or chain drive system. In still other embodiments, column driver 44 is connected directly to column rollers 46, without an additional drive system, allowing rotation of column rollers 46 to move printing column 50 vertically with respect to printing trolley 40.

Printing column 50 includes roller interfaces 51 that interact with column rollers 46. In the exemplary embodiment, printing column 50 has a square cross-section, roller interfaces 51 are angled, and column rollers 46 each have a corresponding V-shaped surface groove 47. In other embodiments, printing column 50 has a circular cross-section, roller interfaces 51 are rounded, and column rollers 46 each have a corresponding U-shaped surface groove 47. Printing head 90 is mounted to a lower end of printing column 50. Printing column 50 is selectively replaceable, i.e. modular and may be removed and replaced as needed in order to provide a greater range of height in printed structures.

In use, machine controller 60 receives instructions for printing a three-dimensional building. Machine controller 60 then actuates tractor motors 21, trolley motor 41, and column driver 44 to position printing head 90 in an initial longitudinal, horizontal, and vertical position, respectively. As printing head 90 expels concrete, machine controller 60 continues to actuate tractor motors 21, trolley motor 41, and column driver 44 to reposition printing head 90 as needed to construct the building according the instructions received.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the terms "about," "substantially" or "approximately" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. A scalable three dimensional printing apparatus comprising at least one tractor assembly movable along a selectively extendable runway assembly, wherein said at least one tractor assembly comprises a plurality of tractor fixed wheels and a tractor motor connected to a tractor drive wheel, wherein a portion of said selectively extendable runway assembly is boated between said plurality of tractor fixed wheels and said tractor drive wheel, said plurality of tractor fixed wheels making rolling contact with the portion of said selectively extendable runway assembly at a first location on a first side of the portion and said tractor drive wheel making roping contact with the portion of said selectively extendable runway assembly at the first location on a second side of the portion opposite from the first side, said plurality of tractor fixed wheels and said tractor drive wheel gripping the portion of said selectively extendable runway assembly therebetween from the opposite first and second sides thereof, wherein said plurality of tractor fixed wheels and said tractor drive wheel rotate while in rolling contact with the portion of said selectively extendable runway assembly; a movable printing trolley which moves along a gantry bridge; and a printing column attached to said movable printing trolley.

2. The apparatus of claim 1, wherein said tractor motor is connected to said tractor drive wheel by a continuous loop connection.

3. The apparatus of claim 1, wherein said at least one tractor assembly further includes a rotational sensor mounted to a feedback wheel which is configured to make rolling contact with a flat surface on the portion of said selectively extendable runway assembly at a second location of the portion, the second location being spaced from the first location.

4. The apparatus of claim 3, wherein said rotational sensor is configured to measure an angular position of the feedback wheel and provide a machine controller for controlling the scalable three dimensional printing apparatus, with positional feedback, by reporting the angular position of the feedback wheel to the machine controller.

5. The apparatus of claim 3, wherein said rotational sensor is a rotary measurement device selected from the group consisting of: an encoder, a resolver, a synchro, a rotary variable differential transformer, and a rotary potentiometer.

6. The apparatus of claim 3, wherein said at least one tractor assembly further includes a biasing mechanism connected to said feedback wheel to bias said feedback wheel into place against the portion of said selectively extendable runway assembly at the second location thereof.

7. The apparatus of claim 6, wherein said biasing mechanism is selected from the group consisting of: a spring tensioner, an additional wheel opposite said feedback wheel, a clamp, and any combination thereof.

8. The apparatus of claim 1, wherein said selectively extendable runway assembly includes a plurality of first runway rails connected end-to-end and a plurality of second runway rails connected end-to-end.

9. The apparatus of claim 1, wherein said gantry bridge is selectively replaceable.

10. The apparatus of claim 1, wherein said gantry bridge is supported by a plurality of gantry legs and wherein each of said plurality of gantry legs has a telescoping configuration.

11. The apparatus of claim 1, wherein said movable printing trolley comprises trolley fixed wheels and a trolley motor connected to a trolley drive wheel, wherein a portion of said gantry bridge is located between said trolley fixed wheels and said trolley drive wheel, said trolley fixed wheels making rolling contact with the portion of said gantry bridge at a first location on a first side of the portion and said trolley drive wheel making rolling contact with the portion of said gantry bridge at the first location on a second side of the portion opposite from the first side, said trolley fixed wheels and said trolley drive wheel gripping the portion of said gantry bridge therebetween from the opposite first and second sides thereof, wherein said trolley fixed wheels and said trolley drive wheel rotate while in rolling contact with the portion of said gantry bridge.

12. The apparatus of claim 1, wherein said movable printing trolley further includes a plurality of column rollers surrounding said printing column and wherein said plurality of column rollers is arranged in a plurality of planes surrounding said printing column.

13. The apparatus of claim 12, wherein said plurality of column rollers movably contact a plurality of roper interfaces on said printing column.

14. The apparatus of claim 13, wherein each of said plurality of column rollers has a surface groove selected from the group consisting of V-shaped and U-shaped, and each of said plurality of roller interfaces has a configuration selected from the group consisting of angled and rounded.

15. A scalable three dimensional printing apparatus comprising at least one tractor assembly movable along a selectively extendable runway assembly, wherein said at least one tractor assembly comprises a plurality of tractor fixed wheels and a tractor motor connected to a tractor drive wheel, wherein a portion of said selectively extendable runway assembly is located between said plurality of tractor fixed wheels and said tractor drive wheel, wherein said plurality of tractor fixed wheels and said tractor drive wheel rotate while in rolling contact with the portion of said selectively extendable runway assembly at a first location of the portion; a movable printing trolley which moves along a gantry bridge; and a printing column attached to said movable printing trolley, wherein said at least one tractor assembly further includes a feedback wheel which is configured to make rolling contact with a flat surface on the portion of said selectively extendable runway assembly at a second location of the portion; wherein said plurality of tractor fixed wheels are configured to make rolling contact on a first side of the portion of said selectively extendable runway assembly at the first location thereof, said tractor drive wheel is configured to make rolling contact on a second side of the portion of said selectively extendable runway assembly at the first location thereof, and the feedback wheel is configured to make rolling contact on the second side of the portion of said selectively extendable runway assembly at the second location thereof, the second location being spaced from the first location; wherein said plurality of tractor fixed wheels and said tractor drive wheel are configured to grip the portion of said selectively extendable runway assembly therebetween from the opposite first and second sides thereof.

16. The apparatus of claim 15, wherein said at least one tractor assembly further includes a biasing mechanism connected to the feedback wheel to bias the feedback wheel into place against the second side of the portion of said selectively extendable runway assembly at the second location thereof.

17. The apparatus of claim 15, wherein said at least one tractor assembly further includes a rotational sensor mounted to the feedback wheel and configured to measure an angular position of the feedback wheel and provide a machine controller for controlling the scalable three dimensional printing apparatus, with positional feedback, by reporting the angular position of the feedback wheel to the machine controller.

18. The apparatus of claim 17, wherein said at least one tractor assembly further includes a biasing mechanism connected to the feedback wheel to bias the feedback wheel into place against the second side of the portion of said selectively extendable runway assembly at the second location thereof.

19. The apparatus of claim 15, wherein said movable printing trolley comprises trolley fixed wheels and a trolley motor connected to a trolley drive wheel, wherein a portion of said gantry bridge is located between said trolley fixed wheels and said trolley drive wheel, said trolley fixed wheels making rolling contact with the portion of said gantry bridge at a first location on a first side of the portion and said trolley drive wheel making rolling contact with the portion of said gantry bridge at the first location on a second side of the portion opposite from the first side, said trolley fixed wheels and said trolley drive wheel gripping the portion of said gantry bridge therebetween from the opposite first and second sides thereof, wherein said trolley fixed wheels and said trolley drive wheel rotate while in rolling contact with the portion of said gantry bridge.

20. The apparatus of claim 15, wherein said movable printing trolley further includes a plurality of column rollers surrounding said printing column and wherein said plurality of column rollers is arranged in a plurality of planes surrounding said printing column.

\* \* \* \* \*